(12) United States Patent
Liu et al.

(10) Patent No.: US 7,481,365 B2
(45) Date of Patent: Jan. 27, 2009

(54) SYSTEM AND METHOD FOR TRANSACTION CARD ELECTRONIC MESSAGING

(75) Inventors: Lurng-Kuo Liu, Mount Kisco, NY (US); Christos John Georgiou, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 11/481,358

(22) Filed: Jul. 5, 2006

(65) Prior Publication Data

US 2008/0006688 A1 Jan. 10, 2008

(51) Int. Cl.
*G06K 5/00* (2006.01)
(52) U.S. Cl. .................. 235/380; 235/487; 235/492
(58) Field of Classification Search .............. 235/380, 235/487, 375, 486, 492, 451; 705/41, 1
See application file for complete search history.

(56) References Cited

U.S. PATENT DOCUMENTS 7,188,089 B2 * 3/2007 Goldthwaite et al. .......... 705/67

* cited by examiner

*Primary Examiner*—Edwyn Labaze
(74) *Attorney, Agent, or Firm*—Scully, Scott, Murphy & Presser, P.C.; Daniel P. Morris, Esq.

(57) ABSTRACT

A system and method for delivering electronic messages automatically to transaction cards. The transaction cards are capable of rendering electronic messages from a server using a transaction activated connection. This system can be used to automatically deliver user specific information such as calendar, reminder, or e-mail information to a person scanning their card in, for example, a building where scanning a badge is required to enter the building. Alternatively, the system can be used to automatically deliver public information to a user such as advertisements to a render-capable transaction card which includes, for example, a calling card, a credit card, or a public transportation access card.

1 Claim, 2 Drawing Sheets

SYSTEM AND METHOD FOR TRANSACTION CARD ELECTRONIC MESSAGING

FIELD OF THE INVENTION

The invention relates to a system and method for delivering electronic messages from a server to a transaction card via a network, and more particularly, to a system and method for delivering electronic messages automatically from a server to one or more transaction cards which are capable of rendering electronic messages.

BACKGROUND OF THE INVENTION

Currently, electronic message communication is extensively used as an information transmission means. For example, pervasive digital devices such as Personal Digital Assistants (PDAs) and smart cards have become more useful and powerful. Further examples include, texting messages, email, and instant messaging using personal computers and cell phones. Transaction cards are ubiquitous and relied upon by users to purchase goods and engage in banking transactions, enter secure facilities, record data such as entering and leaving time of a facility or area, and many other functions. In general, a transaction card uses a magnetic stripe or an embedded silicon chip to store a personal profile or secure data on the transaction card and provides means for enabling access to the stored data or information using, e.g., electronic card swipe or like card reader mechanisms. Other non-secure data such as a logo, or customer service information are hard-printed on the surface of the transaction cards and stay unchanged throughout the card's life cycle. Users rarely pay attention to what is printed on the surface of the transaction cards. Therefore, the real estate on the transaction card is not well utilized for messaging or advertising to the card user.

Further, traditional transaction cards such as credit cards, phone cards, public transportation access cards, etc. are still widely used in most people's daily life. A transaction card is highly portable, and thereby it would be desirable to have a transaction card become part of a telecommunications system. Such a transaction card would enables end-users to receive communications, as well as, interact with a network using electronic digital communication by consistently or periodically connecting to a server, a network node, or like networked computing device.

SUMMARY OF THE INVENTION

The invention relates to a system and method for dynamically delivering and rendering electronic messages on a transaction card. In a preferred aspect of the invention, the system includes a server workstation or like computing device executing applications that generate an electronic message, a network communications link for enabling communication of the electronic message to/from the server, and a transaction card reader which provides read and write function for reading/writing data information from/to a transaction card and is adapted to communicate the data/information with the network via the communication link. The transaction card includes a power source, and a rendering component which communicates to a user the electronic message from the network.

In a related aspect of the invention, a communication element communicates with the transaction card reader. The communication element identifies the transaction card to the server, and the communication element receives the electronic message and a processing element interacts with the communication element by forwarding the electronic message to the rendering element.

In a related aspect of the invention, the transaction card includes an identification (ID). The server application differentiates messages as personal and public in accordance with the ID, and the server delivers the electronic message to a corresponding transaction card.

In a related aspect of the invention, the transaction card further includes a storage element interacting with the communication element and the processing element for storing at least part of the electronic message.

In a related aspect of the invention, the transaction card reader reads and writes to the communication element.

In a related aspect of the invention, the rendering element, the communication element, and the processing element include circuitry to communicate therebetween.

In a related aspect of the invention, the communications element includes a wireless receptor for receiving the message from the transaction card reader.

In a related aspect of the invention, the communication element and the processing element receive and transmit a hyper-link to the rendering element.

In a related aspect of the invention, the rendering element includes speakers for communicating to the user.

In a related aspect of the invention, the rendering element includes electronic paper for displaying a text message.

In a related aspect of the invention, the rendering element includes a light emitting element visible to the user.

In a related aspect of the invention, the transaction card further includes a transaction card ID, and a communication element for identifying the transaction card to the server using the transaction card ID. The communication element receives a specific electronic message associated with the transaction card ID, and a processing element interacting with the communication element by transmitting the electronic message to the rendering element.

In a related aspect of the invention, the transaction card further includes a storage element interacting with the communication element and the processing element for storing at least part of the electronic message and the transaction card ID.

In another aspect of the invention, a system for dynamically delivering and rendering electronic messages on a transaction card comprises a server executing an application for generating an electronic message. A network enables communication between the server and a transaction card reader for transporting the electronic message. A transaction card communicates with the network via the transaction card reader, and a communications element is integral with the transaction card and adapted to communicate information with the transaction card reader. A processing element is integral with the transaction card and communicates with the communications element. The processing element is adapted to receive information from the communications element. A storage element is integral with the transaction card and communicates with the processing element, and the storage element is adapted to receive and store information from the processing element. A rendering element is integral with the transaction card and communicates with the processing element. The rendering element is adapted to communicate to a user the electronic message from the network. A power source is integral with the transaction card and adapted to supply power to the processing, storage, and rendering elements.

In a related aspect of the invention the processing element retrieves information from the storage element and transmits the information to the rendering element.

In a related aspect of the invention the processing, communication, rendering, and storage element include circuitry for communicating therebetween and are coupled to the power source.

In a related aspect of the invention the transaction card reader is adapted to read and write to the communications element of the transaction card.

In another aspect of the invention, a method for dynamically delivering and rendering electronic messages on a transaction card comprises providing a transaction card and a transaction card reader. Providing a server including a program capable of processing data and transporting data, and providing network communication between the transaction card reader and the server. The step of communicating data between the transaction card and the transaction card reader and then communicating the data to the server via the network. The step of processing the data at the server, and the step of generating an electronic message from the server. The step of transporting the electronic message to the transaction card reader via the network, and the step of receiving the electronic message on the transaction card. Lastly, communicating the electronic message on the transaction card to a user.

In a related aspect of the invention communicating the information between the transaction card and the transaction card reader includes swiping the transaction card through the transaction card reader.

In a related aspect of the invention, communicating the electronic message on the transaction card includes displaying the message as text.

DETAILED DESCRIPTION OF THE INVENTION

The present invention provides a system and method for automatically delivering electronic messages to render-capable transaction cards from a server using a transaction activated network connection. A render-capable transaction card has the ability to display text of an electronic message to a user. The render-capable transaction card may also communicate a message to a user by alternative means, such as, displaying colors, or emitting sounds. For example, devices which could be made render-capable include, badges for scanning into buildings, calling cards for making phone calls, credit cards/debit cards for making purchases, or public transportation access cards for accessing, for example, subways, railroads, trolleys, or other similar processes using card-like devices. The electronic messaging system of the present invention may also comprise transactions from, or identifications of, a large amount of render-capable transaction cards, a plurality of transaction card readers connected through a network, and/or an electronic messaging server through which electronic messages are delivered to multiple transaction cards when connected.

Figure 1:
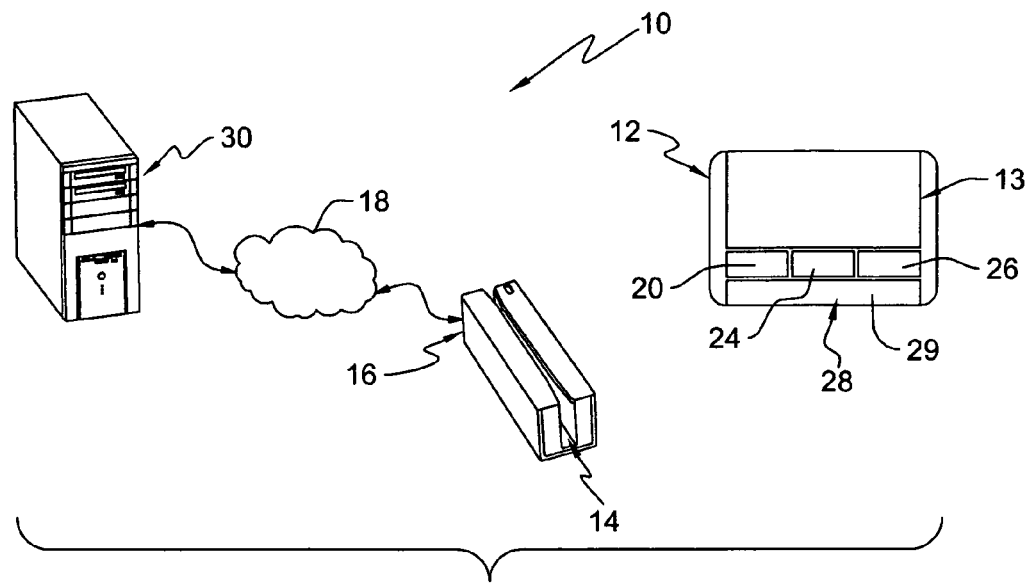
FIG. 1 is a block diagram of a preferred electronic messaging system depicting a render-capable transaction card, a server, a network, and a transaction card reader.

FIG. 1 depicts an embodiment of the electronic messaging system 10 according to the present invention which includes an electronic messaging server 30. The server 30 may be a network or web server, network node, database server, workstation, or any networked computing device capable of supplying messages. The server 30 communicates with a transaction card reader 16 via a network 18 for delivering electronic messages to a render-capable transaction card 12. The network 18 may include, for example, wired or wireless networks, LAN, WAN, public or private intranet, the internet, etc. In an example embodiment, the electronic messaging system 10 may include a plurality of transaction card readers 16 connected through the network 18 to the server 30. The electronic messaging server 30 of the system 10 delivers the electronic message to a transaction card 12. The transaction card 12 interfaces with the card reader 16 for read/write access of the electronic message by a user swiping the card through a channel or slot 14 in the transaction card reader 16.

The transaction card reader 16 channel 14 shown in FIG. 1 provides for swipe card data read/write access, however, it is also envisioned that communication with the transaction card 12 may be accomplished using contact-less proximity scanning or other means for reading the transaction card, such as, wireless infrared or optical communication means etc. Further, it is envisioned that the transaction card reader includes a reader which can be fed and retain a card for several seconds to read information from the card, as well as, write information to the card before presenting the card to the user. The transaction card 12 may be any render-capable transaction card, for example, a badge, a calling card, a credit card, or a public transportation access card.

It is envisioned that the transaction card reader 16 shown in FIG. 1 is adapted to swiping transaction cards for public access, such as trains, such that the card 12 is read and written to in a one swipe time interval. The corresponding message is sent from server 30 via a local network or on site computer capable of transmitting the corresponding message within the one swipe time frame.

In another embodiment according to the invention, for user specific information, it is envisioned that the transaction card is loaded in a transaction card reader (not shown) which holds the card for several seconds to read and write a user specific message to the card, and then presents the card to the user. In this case, the user may be entering a secure building site or building complex. The transaction card 12 is fed into a card reader (not shown) which reads and sends a corresponding user specific message to the card, and then presents the card to the user.

Figure 4:
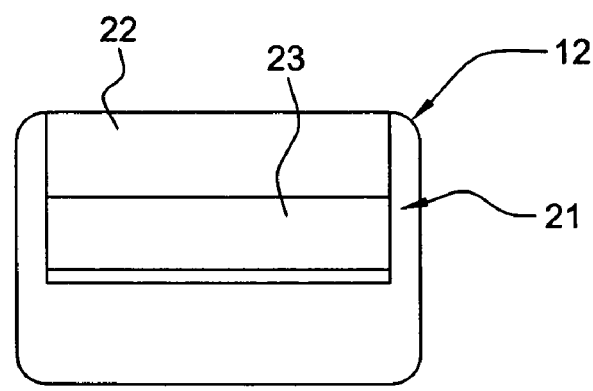
FIG. 4 is a front elevational view of the render-capable transaction card showing render-capable electronic paper.
Figure 5:
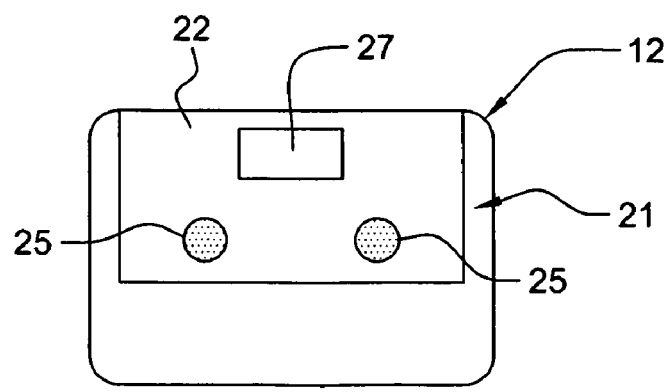
FIG. 5 is a front elevational view of the render-capable transaction card including audio speakers for emanating sounds and a light emitting area.

In one embodiment of the invention, the render-capable transaction card 12 includes an electronic message rendering component 22 such as render-capable electronic paper 23, as shown in FIG. 4, formed on or integrated with the front surface 21 of the transaction card 12. Electronic paper display in contrast to traditional display technologies can be used to display electronic messages on a paper-like electronic paper. Electronic paper 23 may be used to display specified colors having any number of predetermined meanings to the user. The rendering component 22 may additionally comprise an audio device such as speakers 25, as shown in FIG. 5 for rendering the electronic message as an audio sound signal. Further, as shown in FIG. 5, a light emitting element 27 is depicted for indicating to the user any number of preset messages, such as flashing different color lights to indicate corresponding messages, or having the light on indicating to report to a previously specified location, etc.

In a further embodiment according to the invention, the transaction card 12 may receive a local message generated from the transaction card reader when communicating with the transaction card. The transaction card reader would read and write the message to the transaction card locally when the transaction card is either swiped or fed into the transaction card reader. The transaction card would thereby display the message via the rendering component.

Referring to FIG. 1, on the other surface 13 of the transaction card 12 there is provided a processing component 24 which includes circuitry, or an embedded microprocessor device or like processing device (ASIC) for executing electronic messaging rendering according to the invention. A storage component 26 includes circuitry coupled to the processing component 24 circuitry to provide storage capability of information received from the processing component 24 for the transaction card 12. The transaction card 12 further includes a communications component 28 including a magnetic stripe 29 or magstripe.

The communications component 28 further includes circuitry coupled to the processing component to communicate information therebetween such as a user's identification (ID) to be transmitted to a server 30, or a message received from the server transmitted to the communications component 24. Additionally, contact-less proximity scanning between a card reader and the card 12 may transmit information to a wireless receptor of the communications component 28 having circuitry to receive and forward the data to the processing component 24 of the transaction card 12. A paper-thin power supply component 20 provides the power for the components 28, 24, and 26, and speakers 25, light 27, and rendering component 22.

Figure 3:
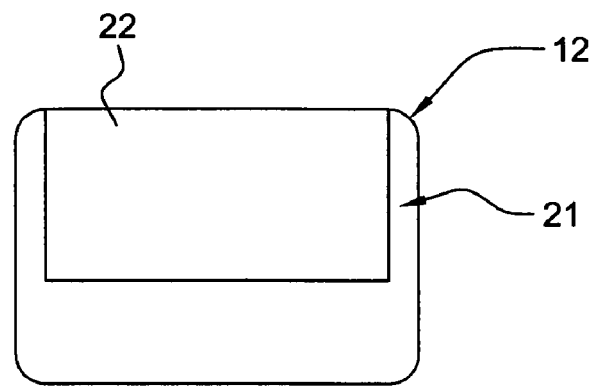
FIG. 3 is a front elevational view of the render-capable transaction card showing a rendering component.

Referring to FIG. 3, the render-capable transaction card 12 includes a rendering component 22 on the one surface 21 of the transaction card 12. The rendering component 22 includes circuitry coupled to the processing component 24. The rendering component displays different types of electronic messages, e.g., text, lights, and/or can be adapted to render sounds. The rendering component 22, shown in FIG. 4, further accommodates render-capable electronic paper 23 for displaying the messages. Electronic paper is typically comprised of ultra-thin plastic. One form of electronic display generally includes electronic ink printed onto a sheet of plastic film that is laminated to a layer of circuitry. The circuitry forms a pattern of pixels that can then be controlled by a display driver.

A component of electronic ink is a plethora of tiny microcapsules, about the diameter of a human hair. As an example, each microcapsule may contain positively charged white particles and negatively charged black particles suspended in a clear fluid. When a negative electric field is applied, the white particles move to the top of the microcapsule where they become visible to the user as white. At the same time, an opposite electric field pulls the black particles to the bottom of the microcapsules where they are hidden. When the process is reversed, the black particles appear at the top of the capsule such that the surface appears dark at that spot. The microcapsules are suspended in a liquid carrier medium allowing them to be printed using existing screen-printing processes onto virtually any surface, including glass, plastic, fabric and even paper.

Generally, writing data to a card's magnetic stripe requires the use of an encoder. A card reader can understand the information on the magnetic stripe. A reader detects the changes in its magnetic field caused by the flux reversals on the card's magnetic stripe. Typically, card readers use a swipe reader, where the card is swiped through a long narrow slot that is open at each end, or an insert reader, where the card is inserted into a small receptacle that is just large enough to accommodate the card, or a proximity reader, where the card is held in front of the blank face of the reader. All of which readers are envisioned as embodiments for reading and writing to the magnetic stripe 28 of the transaction card 12 according to the present invention. It is also envisioned that a card reader according to the present invention may include circuitry which communicates information to the storage component in the transaction card.

The communications component 28 via the magnetic stripe 29 establishes a connection between the processing component 24 and the card reader 16 and ultimately the remote electronic messaging server 30. The connection between the processing component 24 and the server 30 is established using the network 18 to accommodate communication between the card reader 16 and the processing component 24. The circuitries on the render-capable transaction card 12 are powered by the power component 20, such as a battery. The processing component 24 in the transaction card 12 receives electronic messages from the communication link 14 of the transaction card reader 16 and processes the messages to determine how the electronic messages should be rendered or stored. The rendering component 22 displays a text message. However, other communication formats are supported such as sounds, or indicating colors having a predetermined meaning to the user.

For example, the transaction card 12 can be used as a badge for ID scanning entry to buildings, a credit card/debit card for making purchases, or a calling card for making a phone call. Electronic "day timer" messages such as calendar, reminder, and e-mail are rendered on the render-capable transaction cards upon login or call acceptance.

In another preferred mode of the present invention, the transaction card can be used as a public transportation access card for accessing, for example, subways, busses, or trains. Electronic advertisement can be delivered and displayed on the public transportation access card upon successful connection. The electronic advertisement can further be tailored to each individual profile when the card has a personal ID encoded on the magnetic stripe 29 or stored in transaction card 12 storage component 26. When the transaction card 12 has a personal ID, the server can deliver a corresponding message to the card by using a correspondence table stored in the server 30 that maps a user ID with a particular message and accessible by the program 100 implementing the methodologies will be described in greater detail with respect to FIG. 2.

The transaction card may also receive a hyper-link address. The user can then further pursue the hyperlink information from an internet capable location by inputting the hyper-link address a computer, hand held personal computer, or the like.

Figure 2:
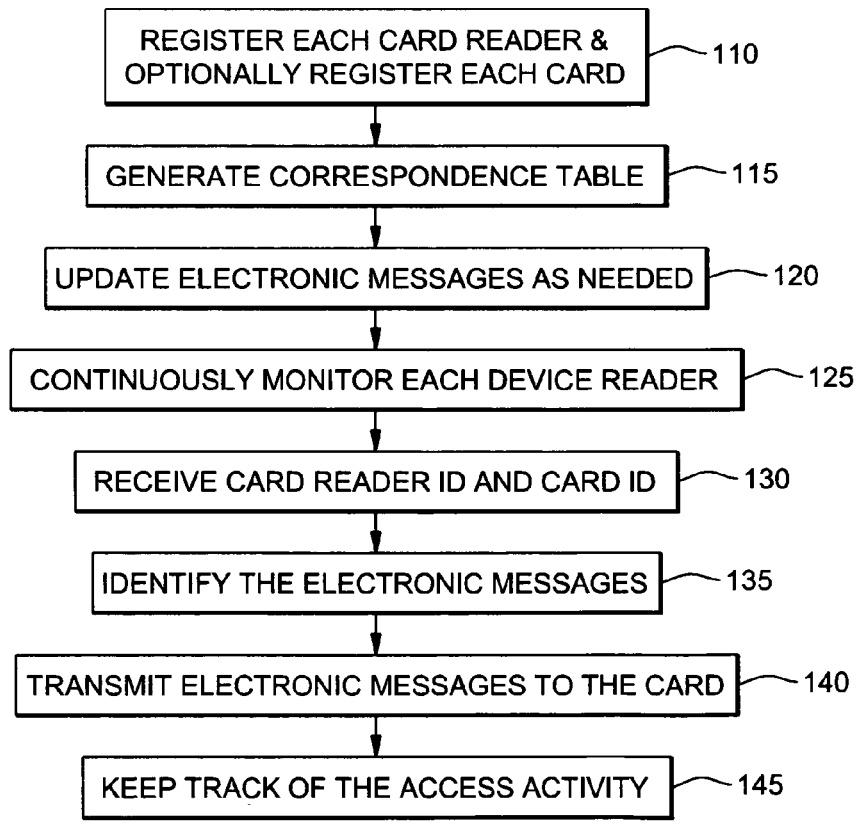
FIG. 2 is a flow chart of an embodiment of the present invention depicting steps for managing transaction card electronic messaging.

FIG. 2 depicts an example embodiment of a program 100 executing on the server 10 shown in FIG. 1 that initiates electronic message rendering for transaction cards according to the invention. More particularly, the program 100 is capable of associating and managing the correspondence between a transaction card's identification (ID) and a user's electronic messages. The program 100 also determines which transaction card reader 16 and transaction card 12 is making requests and consequently delivers the corresponding electronic messages to the corresponding transaction card 12.

The first step 110 of the program 100 includes registering each transaction card reader 16 and select transaction cards 12 with the server 30 program 100. The transaction cards are either associated with the individual users of the electronic messaging system and thereby registered, or categorized as general public transaction cards that have no association with a specific user. The cards without association to a specific user receive generalized messages, while the cards associated with individual users can receive user-specific targeted electronic messages, as well as, generalized messages. The transaction card reader 16 may include an identification associated with a specific location and will be used for selecting corresponding electronic messages when a connected transaction card is categorized as a general public transaction card. Thereby, a generalized message will be sent to a card accessing such a reader.

In step 115, the correspondence between transaction card IDs or transaction card reader IDs and electronic messages for each user is managed by a correspondence table. That is, in an off-line process, the table is generated for the server to associate a message with a user, card or location etc.

Next, in step 120, the electronic messages for each user referenced by the corresponding table is updated as needed.

In step 125, the electronic messaging server continuously monitors the request from each transaction card.

In step 130, a transaction card ID and reader ID is received, the program 100 identifies the corresponding electronic messages based on either the transaction card 12 ID or reader 16 identification using its correspondence (look-up) table generated in step 115.

In step 140 the electronic messages are communicated to the transaction card for rendering. For example, the protocol for communication may include TCP/IP, HTTP, or secure sockets, serial data stream.

Lastly, in step 145, the activity for each electronic message delivery can also be logged for other purposes.

In operation, the electronic messaging server 30 is equipped with a transaction card interface capable of identifying the user using the transaction cards 12 as whether a user is a public user or a user having a specific ID. When a user has a specific ID, the server 30 includes a means to specify the electronic messages each individual user is entitled to receive. The identification of the user is accomplished by associating or categorizing in advance the individual users transaction card as use for general public devices, which have no association with any specific individual users, or specific users with corresponding transaction card readers (not shown) and transaction card IDs. The electronic messaging server 30 is equipped with a correspondence table storing means for storing a table of correspondence between transaction cards 12 IDs, the electronic messages for each user, and the user's location. The transaction card reader, upon successful interface with a transaction card 12, transmits the transaction card 12 ID via the network 18 to the electronic messaging server 30. The electronic messaging server 30 identifies the electronic messages corresponding to the user of the transaction card ID by referencing the correspondence table, and transmits the corresponding electronic messages to the user. Thereby, the electronic messages transmitted to the user are rendered and viewed on the rendering component of the render-capable transaction card 12.

An embodiment of the present invention includes providing the transaction card 12, the transaction card reader 16, and the server 30 capable of reading sending a message. In operation, the transaction card 12 is swiped through the channel 14 of the transaction card reader 16 in the preferred embodiment shown in FIG. 1 to access a public site, such as public transportation. Within that one swipe transaction, the communication component 28 transmits the card ID from the magnetic stripe 29 using the transaction card reader 16, and the network 18 to the server 30. The server 30 processes the information via the look-up table, accesses a corresponding message which, in this case, is for a public access card, via the same return path. The communication component 28 of the card 12 reads the data message received via the swipe, and processes the data using the processing component 24. The processing component 24 transmits data to the storage component 26 and/or transmits data to the rendering component 22 for display. The storage component 26 may hold part of a lengthy message, a URL (uniform resource locator, or web site address), as well as the transaction card ID. Multiple messages may be stored in the storage component and displayed sequentially, such that text is scrolled across the display area of the rendering component 22.

Another embodiment of the present invention, referring to FIG. 1, includes providing the transaction card 12, a transaction card reader (not shown), and the server 30 capable of sending a message. In operation, the transaction card 12 is fed into a card reader (not shown). The card reader keeps the card for several seconds during a read/write cycle while the server 30 is accessed through the network 18 utilizing the internet, or a wide area network. Similar to the operation after swiping the transaction card, within the read/write cycle, communication component 28 transmits the card ID from the magnetic stripe 29 and the network 18 to the server 30. The server 30 processes the information via the look-up table, accesses or generates a corresponding message which is user specific and may also include an additional public message. The communication component 28 of the card 12 reads the data message received via the card reader, and processes the data using the processing component 24. The transaction card 12 is then presented to the user. The processing component 24 may transmit data to the storage component 26 and/or transmits data to the rendering component 22 for display.

An advantage of the system of the present invention directed to delivering user specific messages is that it can be used to automatically deliver a calendar, a reminder, or an e-mail to a person in a building where, in a preferred embodiment, a scanned badge is required to enter the building. In the embodiment of the present invention directed to a public user, the system can also be used to deliver advertisements to a render-capable transaction card, for example, a calling card, a credit card, or a metro card. Another advantage of the system is that a user is more likely to see a message with newly changed information because it is more likely to grasp the user's attention.

In another embodiment according to the invention, a plurality of distributed electronic messaging servers can be used instead of a single electronic messaging server. Local individual servers may be tailored to generate electronic messages for the general public in a specific locality.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A method for dynamically delivering to and rendering electronic messages on a transaction card, comprising:

provideing a transaction card and a transaction card reader, the card reader enabling data communications between the transaction card and the transaction card reader;

providing a server including a program for processing data and transporting data;

providing network communication between the transaction card reader and the server, the server identifying the transaction card using an identification (ID) received at the server via the network;

communicating the data to the server via the network;

processing the data at the server via the program;

differentiating messages as personal and public according to the ID received by the server;

generating an electronic message at the server based on the data and the received ID;

transporting the electronic message to the transaction card reader via the network;

writing data to the transaction card using the transaction card reader, the transaction card receiving the electronic message;

processing the electronic message in the transaction card by forwarding the electronic message to a rendering element formed on a surface of the transaction card;

storing at least part of the electronic message on a storage element in the transaction card; and communicating the electronic message on the transaction card to a user, the communication including displaying the electronic message as text on said transaction card surface via said rendering element.

* * * * *